(12) United States Patent
Osbat et al.

(10) Patent No.: US 8,261,537 B2
(45) Date of Patent: Sep. 11, 2012

(54) MOUNTING DEVICE FOR AN INJECTOR IN AN EXHAUST SYSTEM OF AN INTERNAL COMBUSTION ENGINE

(75) Inventors: Giovanni Osbat, Riolo Terme (IT); Carlo Nazareno Grimaldi, Perugia (IT); Paolo Cominetti, Bologna (IT); Alessandro Mariani, Fossato di Vico (IT)

(73) Assignee: Magneti Marelli S.p.A., Corbetta (IT)

( * ) Notice: Subject to any disclaimer, the term of this patent is extended or adjusted under 35 U.S.C. 154(b) by 791 days.

(21) Appl. No.: 12/382,716

(22) Filed: Mar. 23, 2009

(65) Prior Publication Data

US 2009/0241906 A1  Oct. 1, 2009

(30) Foreign Application Priority Data

Mar. 28, 2008 (EP) .................................. 08425206

(51) Int. Cl.
*F01N 3/00* (2006.01)

(52) U.S. Cl. ............... 60/286; 60/295; 60/298; 60/301; 60/303; 137/338; 239/129; 239/132.1; 239/132.3

(58) Field of Classification Search .................. 60/274, 60/286, 295, 298, 301, 303, 320; 137/338; 239/128, 129, 132.1, 132.3
See application file for complete search history.

(56) References Cited

U.S. PATENT DOCUMENTS

| | | | | |
|---|---|---|---|---|
| 5,522,218 A * | 6/1996 | Lane et al. | .................. | 60/274 |
| 6,192,677 B1 | 2/2001 | Tost | | |
| 6,279,603 B1 * | 8/2001 | Czarnik et al. | ................ | 137/339 |
| 6,513,323 B1 * | 2/2003 | Weigl et al. | .................... | 60/286 |
| 6,814,303 B2 * | 11/2004 | Edgar et al. | .................... | 239/128 |
| 7,509,799 B2 * | 3/2009 | Amou et al. | ..................... | 60/286 |
| 7,603,849 B2 * | 10/2009 | Hanitzsch et al. | ............. | 60/286 |
| 7,614,213 B2 * | 11/2009 | Hirata et al. | ................... | 60/286 |
| 8,024,922 B2 * | 9/2011 | van Vuuren et al. | ........... | 60/286 |
| 2006/0107655 A1 | 5/2006 | Hanitzsch | | |

FOREIGN PATENT DOCUMENTS

| | | |
|---|---|---|
| DE | 19919426 | 3/2000 |
| DE | 102005061145 | 6/2007 |
| JP | 09096212 | 4/1997 |
| WO | WO 2008/080695 | 7/2008 |

OTHER PUBLICATIONS

European Search Report mailed Aug. 8, 2008 in European Appln. No. 08425206.3-2311.
International Search Report mailed Feb. 14, 2008 in PCT Appln. No. PCT/EP/2007/062440.

* cited by examiner

*Primary Examiner* — Binh Q Tran
(74) *Attorney, Agent, or Firm* — Davidson Berquist Jackson & Gowdey, LLP

(57) ABSTRACT

A mounting device for an injector in an exhaust system of an internal combustion engine; the mounting device is provided with a tubular support body, which is made of a thermally conductive material, houses the injector therein, and is adapted to be coupled to a connection tube laterally extending outwards from an exhaust conduit of the exhaust system at a lower end thereof; an upper portion of the support body is thermally coupled to an upper portion of a nose of the injector so that a high thermal exchange occurs by conduction between the upper portion of the nose of the injector and the upper portion of the support body; and a lower portion of the support body is thermally insulated from a lower portion of the nose of the injector so that a reduced thermal exchange occurs by conduction between the upper portion of the nose of the injector and the upper portion of the support body.

28 Claims, 3 Drawing Sheets

MOUNTING DEVICE FOR AN INJECTOR IN AN EXHAUST SYSTEM OF AN INTERNAL COMBUSTION ENGINE

TECHNICAL FIELD

The present invention relates to a mounting device for an injector in an exhaust system of an internal combustion engine provided with exhaust-gas post-treatment.

The present invention is advantageously applied to an electromagnetic injector, to which explicit reference will be made in the following description without therefore loosing in generality.

BACKGROUND ART

The future international standards relating to the control of the emissions of polluting gases produced by cars (the so-called "Euro5" and "Euro6" or "Tier2 Bin5" standards) provide for a very low limit for the $NO_x$ molecules which may be released in the atmosphere.

Respecting such limits is particularly important especially for diesel engines; for this reason, it has been suggested to provide the exhaust system of a diesel engine with an additional $NO_x$ Selective Catalytic Reduction (SCR) converter adapted to convert the molecules of $NO_x$ ($NO_2$ or NO) to nitrogen ($N_2$), which is an inert gas, and water ($H_2O$). The reduction reaction of the molecules of $NO_x$ to nitrogen (N) is complicated to obtain without the use of an appropriate reducing agent which has generally been identified as ammonia ($NH_3$). The reducing agent must be injected into the exhaust system and upstream of the SCR catalytic converter so as to mix with the exhaust gases before entering the SCR catalytic converter.

However, for obvious safety reasons connected to the toxicity of ammonia, is not recommendable to store ammonia within a car. Therefore, it has been suggested to store and inject an aqueous solution of urea, as urea decomposes to ammonia by the effect of the heat of the exhaust gases and partly also by catalytic effect.

To perform the injection of the aqueous solution of urea upstream of the SCR catalytic converter, it has been suggested to use an electromagnetic injector by all means similar to the electromagnetic injectors currently used for the injection of fuel in internal combustion engines. In this manner, existing components with a proven efficiency and reliability may be used and there is therefore no need to develop new components with obvious saving of time and costs. However, mounting in an exhaust conduit arranged immediately upstream an SCR catalytic converter of an electromagnetic injector originally made for the injection of fuel has revealed problematic, as the temperatures within the exhaust conduit are very high (from a minimum of about 150° C. to a maximum of about 900° C. during the regeneration steps) and may produce an excessive overheating of the electromagnetic injector with the subsequent destruction of the electromagnetic injector itself. By way of example, the temperature of the outer jacket of a currently produced electromagnetic injector must not exceed about 150° C. to avoid melting the insulation of the copper conductor forming the electromagnet coil, while the nose of a currently produced electromagnetic injector must not exceed about 250° C. to avoid steel annealing phenomena which could alter the mechanical features thereof.

Furthermore, it must be noted that not only is it required to ensure that the electromagnetic injector is appropriately thermally insulated from the heat of the exhaust system, but it is also required to ensure that the heat, which has been transmitted by conduction and radiation to the injector and the heat produced by Joule effect by the electromagnet coil within the electromagnetic injector, is effectively dissipated at the same time.

DISCLOSURE OF INVENTION

It is the object of the present invention to provide a mounting device for an injector in an exhaust system of an internal combustion engine, such a mounting device being easy and cost-effective to implement, not displaying the above disclosed drawbacks and, in particular, ensuring an appropriate thermal insulation of the injector from the heat of the exhaust system allowing at the same time an effective heat loss by the injector itself.

According to the present invention, a mounting device for an injector in an exhaust system of an internal combustion engine as claimed in the attached claims.

BRIEF DESCRIPTION OF THE DRAWINGS

The present invention will now be disclosed with reference to the accompanying drawings, which show some non-limitative embodiments thereof, in which.

PREFERRED EMBODIMENTS OF THE INVENTION

Figure 1:
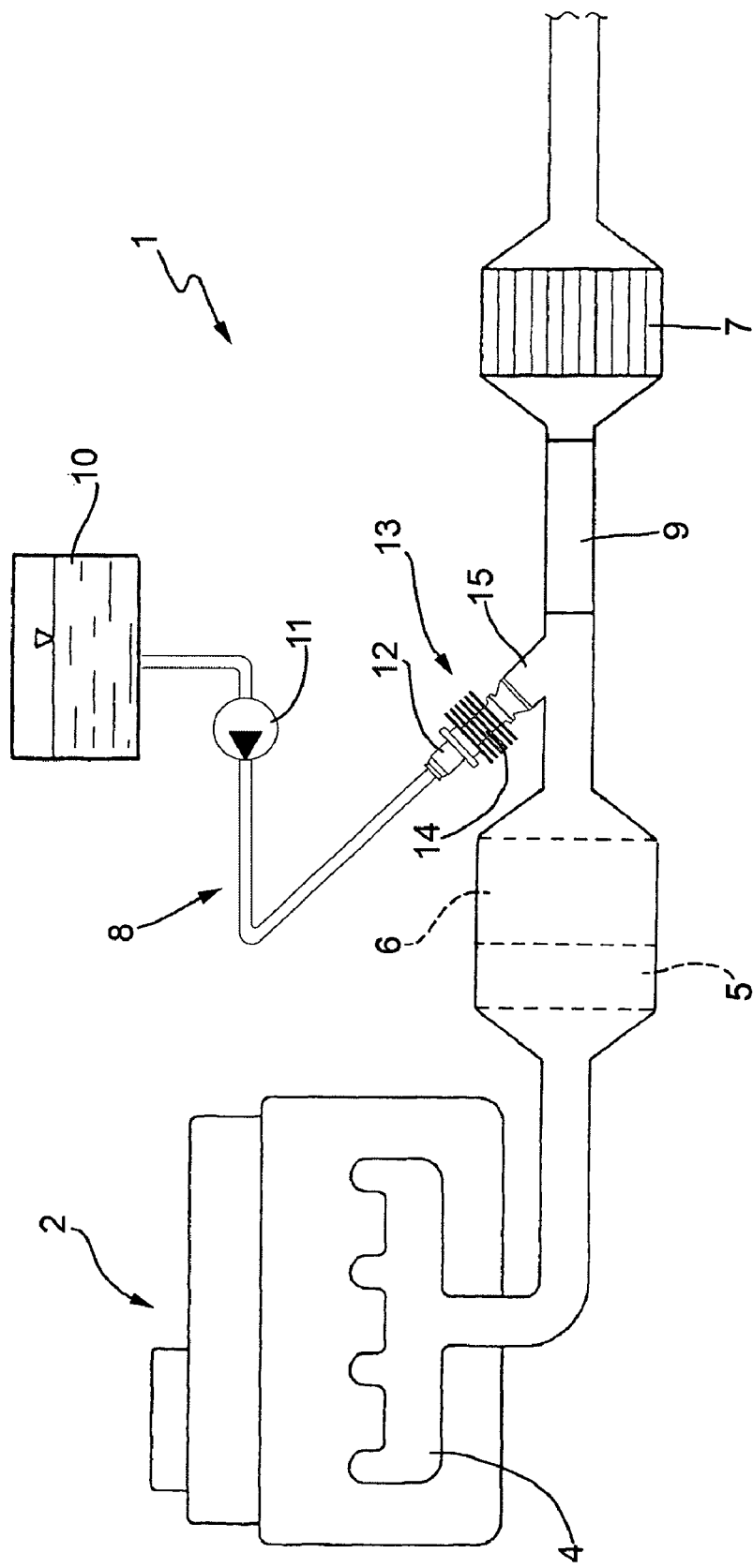
FIG. 1 is a diagrammatic view of an exhaust system for an internal combustion engine provided with exhaust-gas post-treatment.

In FIG. 1, numeral 1 indicates as a whole an exhaust system for an internal combustion engine 2 operating according to the "Diesel" cycle (i.e. fed with diesel fuel or the like).

The exhaust system 1 emits the gases produced by the combustion to the atmosphere and comprises an exhaust conduit 3 which extends from an exhaust manifold 4 of the internal combustion engine 2. An oxidation catalyst 5 and a particle filter 6 are arranged along the exhaust conduit 3; in FIG. 1, the oxidation catalyst 5 and the particle filter 6 are arranged one after the other within the same common tubular container.

Furthermore, a Selective Catalytic Reduction (SCR) system for the post-treatment of $NO_x$ (NO and $NO_2$) molecules is arranged along the exhaust conduit 3 and downstream of the oxidation catalyst 5. The SCR catalytic system 7 may comprise a single SCR catalytic converter as shown in FIG. 1, or it may comprise a set (normally three) catalytic converters which together optimize the SCR operation for the post-treatment of the $NO_x$ molecules.

Immediately upstream of the catalytic system 7, an injection device 8 is coupled to the exhaust conduit 3, the injection device 8 being adapted to inject a reducing additive, specifically an aqueous solution of urea (i.e. a solution of urea and water), into the exhaust conduit 3. In use, by effect of the heat of the exhaust gases within the exhaust conduit 3, the urea injected into the exhaust conduit 3 itself spontaneously decomposes to isocyanic acid (HNCO) and ammonia ($NH_3$), the ammonia serving as a reducing agent within the catalytic system 7 to facilitate the decomposition reaction of the $NO_x$ molecules to nitrogen ($N_2$) and water ($H_2O$).

A static mixer 9 is inserted along the exhaust conduit 3 and at the injection device 8, the static mixer 9 serving to generate turbulences in the exhaust gases within the exhaust conduit 3 so as to avoid local thickening of isocyanic acid (which is formed during the decomposition of urea) and therefore to avoid the polymerization of the isocyanic acid itself and so as to increase the efficiency of the catalytic system 7 thus rendering the dispersion of ammonia in the exhaust gases more homogeneous. In the embodiment shown in FIG. 1, the static mixer 9 is arranged downstream of the injection device 8; as an alternative, the static mixer 9 could be arranged upstream of the injection device 8.

The injection device 8 comprises a reservoir 10 containing the aqueous solution of urea, and a pump 11 which draws liquid in the reservoir 10 to feed the pressurized aqueous solution of urea to an electromagnetic injector 12 adapted to inject the pressurized aqueous solution of urea into the exhaust conduit 3. The electromagnetic injector 12 is attached to the exhaust conduit 3 by means of a mounting device 13 which comprises a tubular support body 14, which is made of a thermally conductive material (typically steel), houses the electromagnetic injector 12 therein, and at its lower end is adapted to be coupled in abutment to a connection tube 15 that laterally extends outwards and obliquely from the exhaust conduit 3.

Figure 2:
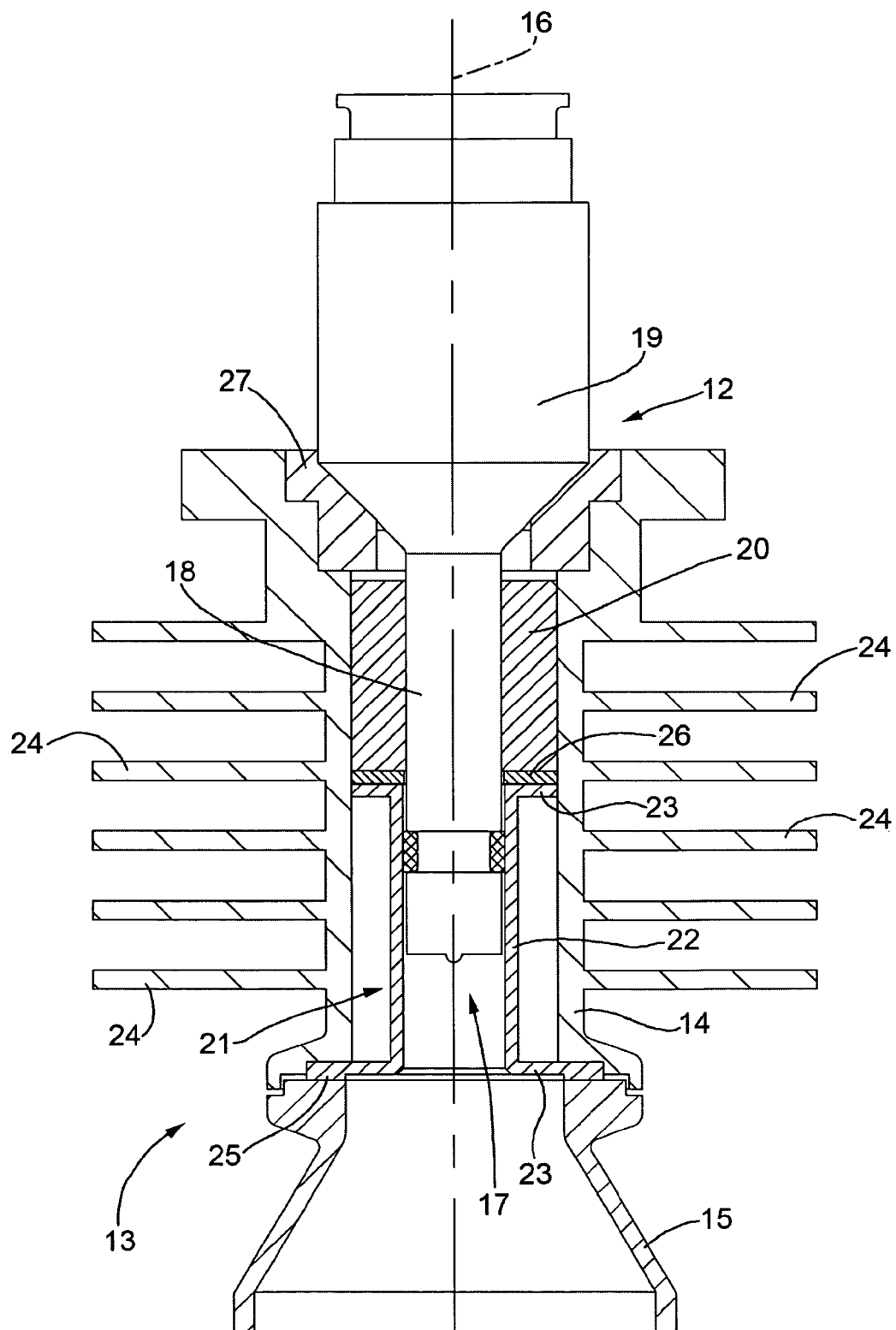
FIG. 2 is a diagrammatic and side section view of a mounting device for an injector in the exhaust system in FIG. 1, such a mounting device being made according to the present invention.

According to FIG. 2, the electromagnetic injector 12 substantially displays a cylindrical symmetry around a longitudinal axis 16 and is controlled in order to inject the aqueous solution of urea from an injection nozzle 17. The electromagnetic injector 12 comprises a nose 18 which ends with the injection nozzle 17 and a jacket 19, which is attached to an end of the nose 18 opposite to the injection nozzle 17 and has a larger diameter with respect to the nose 18. Specifically, the jacket 19 of the electromagnetic injector 12 houses an electromagnet and at least one spring, which act on a mobile keeper, while the nose 18 of the electromagnetic injector 12 houses a needle which is integral with the mobile keeper on one side and supports a shutter adapted to close the injection nozzle 17 on the other side. Preferably, the jacket 19 of the electromagnetic injector 12 is protected by a lid made of a material suitable to withstand the thermal conditions of the environment in which the electromagnetic injector 12 operates; such a lid also serves as a thermal screening for the electric connector (not shown) of the electromagnetic injector 12.

The nose 18 of the electromagnetic injector 12 is completely inserted into the support body 14 whereas the jacket 19 of the electromagnetic injector 12 is substantially arranged externally to the support body 14 so that the jacket 19 of the electromagnetic injector 12 is arranged in the air.

An upper portion of the support body 14 is thermally coupled to an upper portion of the nose 18 of the electromagnetic injector 12 so that a high thermal exchange by conduction and radiation occurs between the upper portion of the nose 18 of the electromagnetic injector 12 and the upper portion of the support body 14; instead, a lower portion of the support body 14 is thermally insulated from a lower portion of the nose 18 of the electromagnetic injector 12 so that a reduced thermal exchange occurs by conduction and radiation between the lower portion of the nose 18 of the electromagnetic injector 12 and the lower portion of the support body 14.

In the embodiment shown in FIG. 2 a tubular conductive element 20, which is made of a thermally conductive material (typically steel), is arranged within the support body 14 at the upper portion of the support body 14 and maintains the upper portion of the nose 18 of the electromagnetic injector 12 thermally coupled to the support body 14. Preferably, the tubular conductive element 20 consists of a tube made of metal material having an external diameter substantially equivalent to the internal diameter of the support body 14 so that between the outer surface of the conductive element 20 and the inner surface of the support body 14 there is no air space. Similarly, the internal diameter of the tubular conductive element 20 is substantially equivalent to the external diameter of the nose 18 of the electromagnetic injector 12 so that between the inner surface of the conductive element 20 and the outer surface of the nose 18 of the electromagnetic injector 12 there is no air space.

Furthermore, a tubular insulating element 21, which is made of a thermally insulating material, is arranged within the support body 14 at the lower portion of the support body 14 and maintains the lower portion of the nose 18 of the electromagnetic injector 12 thermally insulated from the support body 14. Preferably, the tubular insulating element 21 consists of a reel or bush made of a thermally insulating material (or possibly even of a thermally conductive material) and comprises a tubular central body 22 having a smaller external diameter with respect to the internal diameter of the support body 14 and two end flanges 23 which are transversally arranged with respect to the central body 22 and have an external diameter substantially equivalent to the internal diameter of the support body 14. In this manner, there is an air space between the external surface of the central body 22 and the internal surface of the support body 14.

According to a different embodiment (not shown) the tubular insulating element 21 is not provided and its thermal insulating function is entirely carried out by the air space.

According to a preferred embodiment, the support body 14 has a plurality of dissipation fins 24 serving the function of increasing the thermal exchange surface. The dissipation fins 24 are uniformly distributed both at the lower portion of the support body 14, and at the upper portion of the support body 14. According to a different embodiment (not shown), the dissipation fins 24 may reach the jacket 19 of the electromagnetic injector 12 at the electromagnet coil. Each dissipation fin 24 has a discoidal shape arranged perpendicularly to the longitudinal axis 16.

According to a preferred embodiment, the lower end of the support body 14 is thermally insulated from the connection tube 15 so that a reduced thermal exchange occurs by conduction between the lower end of the support body 14 and the connection tube 15. Specifically, an insulating ring 25 is provided, which is made of a thermally insulating material (or is made of a thermally conductive material and displays a reduced contact surface) and is interposed between the lower end of the support body 14 and the connection tube 15. Preferably, the insulating ring 25 is integral with the tubular insulating element 21 and forms an extension of a lower end flange 23 of the tubular insulating element 21. According to a different embodiment (not shown), the insulating ring 25 could be separate and independent of the insulating element 21. According to another embodiment (not shown), there is no insulating ring 25 and its thermal insulating function is carried out by a an air space.

According to a possible embodiment, an insulating ring 26, which is made of a thermally insulating material and serves to increase the thermal insulation between the insulating element 21 and the conductive element 20, is interposed between the insulating element 21 and the conductive element 20.

An annular coupling element 27, which internally negatively reproduces the outer shape of the jacket 19 of the electromagnetic injector 12 and externally positively reproduces the inner shape of the support body 14, is preferably interposed between a lower flared portion of the jacket 19 of the electromagnetic injector 12 (at which level the junction with the nose 18 stands) and the support body 14. A possible function of the coupling element 27 is to avoid the direct transfer of heat by conduction from the support body 14 to the jacket 19 of the electromagnetic injector 12; in this case, the coupling element 27 is made of thermally insulating material. An alternative function of the coupling element 27 is to promote the direct transfer of heat by conduction from the support body 14 to the jacket 19 of the injector; in this case, the coupling element 27 is made of thermally conductive material. A further function of the coupling element 27 is to ensure an appropriate damping of the vibrations which are transmitted from the mounting device 13 to the electromagnetic injector 12; in this case, the coupling element 27 is made of elastic material. Another function of the coupling element 27 is to ensure an appropriate pneumatic sealing from the exhaust conduit 3; in this case, the coupling element 27 serves the function of an O-ring, it is made of an elastic material and is compressed to seal all of the openings so as to avoid leakages.

The functions which are to be performed by the coupling element 27 depend on the structural specifications of the electromagnetic injector 12 and on the operation specifications of the exhaust system 1 and are defined in detail in each case during designing. It is obvious that the coupling element 27 may simultaneously perform multiple functions (for instance thermal insulation, sealing and vibration damping).

Figure 3:
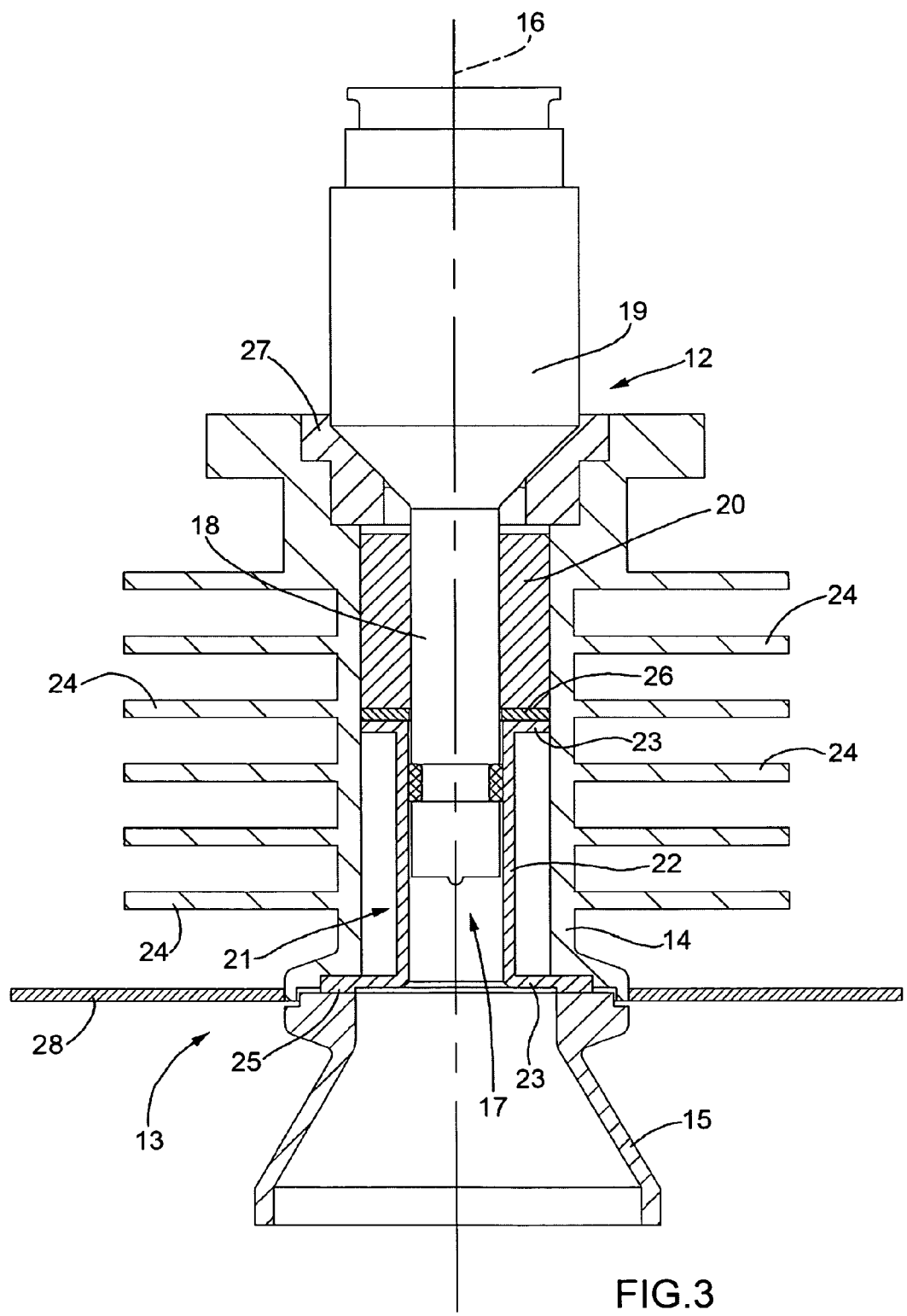
FIG. 3 is a diagrammatic and side section view of the mounting device in FIG. 2.

According to the variant shown in FIG. 3, the mounting device 13 comprises a protective screen 28, which has a discoidal shape, is arranged at a lower end of the tubular body 14, has a larger external diameter with respect to the external diameter of the dissipation fins 24 and serves to avoid the transmission of heat by radiation from the exhaust conduit 3 towards the dissipation fins 24 themselves.

The above disclosed mounting device 13 displays many advantages, as it is simple and cost-effective to implement, it is especially resistant (and therefore has a long working life and a very low failure risk) and especially allows to obtain an effective thermal insulation of the electromagnetic injector 12 from the heat in the exhaust conduit 3 allowing at the same time an effective loss of the heat produced by Joule effect by the electromagnet coil inside the electromagnetic injector 12. Specifically, such a result is obtained in virtue of the fact that the lower portion of the nose 18 of the electromagnetic injector 12 is thermally insulated from the lower portion of the support body 14 so as not to receive (as far as possible) the heat in the exhaust conduit 3, while the upper portion of the nose 18 of the electromagnetic injector 12 is thermally coupled to the upper portion of the support body 14 so as to effectively dissipate the heat from the exhaust conduit 3 which has been absorbed by the nose 18.

The invention claimed is:

1. A mounting device connecting an injector onto an exhaust system of an internal combustion engine comprising a thermally conductive tubular support body in which the injector is retained, the mounting device herein being adapted to be coupled to a connection tube extending outwardly from a lower end of an exhaust conduit of the exhaust system;
    an upper portion of the support body thermally coupled to an upper portion of a nose of the injector so that a high heat exchange by conduction occurs between the upper portion of the nose and the upper portion of the support body;
    a lower portion of the support body thermally insulated from a lower portion of the nose so that a reduced heat exchange occurs by conduction between the lower portion of the nose and the lower portion of the support body;
    a tubular conductive element comprised of a thermally conductive material, arranged within the upper portion of the support body to maintain the upper portion of the nose thermally coupled to the support body;
    a tubular insulating element, made of a thermally insulating material, arranged within the lower portion of the support body to maintain the lower portion of the nose thermally insulated from the support body; and
    a first insulating ring comprised of a thermally insulating material interposed between the tubular insulating element and the tubular conductive element.

2. The mounting device according to claim 1, wherein the tubular conductive element is comprised of a metal material having an external diameter substantially equivalent to an internal diameter of the support body.

3. The mounting device according to claim 1, wherein the tubular insulating element is comprised of a thermally insulating material and comprises a tubular body and an end flange at each opposing end of the central body, the end flanges being transversally arranged with respect to the central body and having an external diameter substantially equivalent to the internal diameter of the support body.

4. The mounting device according to claim 1, wherein the support body further includes a plurality of heat dissipation fins thereby increasing the thermal exchange surfaces.

5. The mounting device according to claim 4, wherein the heat dissipation fins are uniformly distributed both at the lower and upper portions of the support body.

6. The mounting device according to claim 4, wherein the heat dissipation fins extend to a jacket housing an electromagnet coil of the injector.

7. The mounting device according to claim 4, wherein each heat dissipation fin has a discoidal shape arranged perpendicularly to a longitudinal axis of the tubular support body.

8. The mounting device according to claim 4, further including a protective screen arranged at a lower end of the tubular body and having a larger external diameter than the external diameter of the heat dissipation fins to deflect of the heat transmission by radiation away from the heat dissipation fins.

9. The mounting device according to claim 1, wherein a lower end of the support body is thermally insulated from the connection tube so that a reduced thermal exchange occurs between the lower end of the support body and the connection tube.

10. The mounting device according to claim 9, further including a second thermally insulating ring made of thermally insulating material interposed between the lower end of the support body and the connection tube.

11. The mounting device according to claim 10, wherein the first insulating ring is integral with the tubular insulating element.

12. The mounting device according to claim 11, wherein the tubular insulating element is comprised of a thermally insulating material and comprises a tubular central body having a smaller external diameter with respect to the internal diameter of the support body and an end flange at each opposing end of the central body, the end flanges being transversally arranged with respect to the central body and having an external diameter substantially equivalent to the internal diameter of the support body, with the first insulating ring comprising an extension of the end flange at a lower end the tubular insulating element.

13. The mounting device according to claim 1, wherein the nose of the injector is completely inserted into the support body whereas a jacket of the injector at an opposite end from the nose is substantially arranged externally to the support body and is exposed to the air.

14. The mounting device according to claim 1, further including an annular coupling element interposed between a lower portion of a jacket of the injector and the support body.

15. The mounting device according to claim 14, wherein the coupling element internally negatively reproduces the outer shape of the jacket and externally positively reproduces the internal shape of the support body.

16. The mounting device according to claim 14, wherein the coupling element is made of a thermally insulating material and prevents direct heat transfer by conduction between the support body and the jacket.

17. The mounting device according to claim 14, wherein the coupling element is made of a thermally conductive material and promotes a direct heat transfer by conduction between the support body and the jacket.

18. The mounting device according to claim 14, wherein the coupling element is made of elastic material and damps vibrations transmitted to the injector.

19. The mounting device according to claim 14, wherein the coupling element is made of elastic material and pneumatically seal between the support body and the jacket.

20. A mounting device connecting an injector onto an exhaust system of an internal combustion engine comprising a thermally conductive tubular support body in which the injector is retained, the mounting device herein being adapted to be coupled to a connection tube extending outwardly from a lower end of an exhaust conduit of the exhaust system;

an upper portion of the support body being thermally coupled to an upper portion of a nose of the injector so that a high heat exchange by conduction occurs between the upper portion of the nose and the upper portion of the support body;

a lower portion of the support body being thermally insulated from a lower portion of the nose so that a reduced heat exchange occurs by conduction between the lower portion of the nose and the lower portion of the support body;

a lower end of the support body being thermally insulated from the connection tube so that a reduced thermal exchange occurs between the lower end of the support body and the connection tube;

a first thermally insulating ring made of thermally insulating material interposed between the lower end of the support body and the connection tube; and a tubular insulating element, which is made of a thermally insulating material, arranged within the lower portion of the support body of the to maintain the lower portion of the nose thermally insulated from the support body with the first insulating ring being integral with the tubular insulating element; and wherein the tubular insulating element is comprised of a thermally insulating material and comprises a tubular central body having a smaller external diameter with respect to the internal diameter of the support body and an end flange at each opposing end of the central body, the end flanges being transversally arranged with respect to the central body and having an external diameter substantially equivalent to the internal diameter of the support body, with the first insulating ring comprising an extension of the end flange at a lower end the tubular insulating element.

21. The mounting device according to claim 20, further including an annular coupling element interposed between a lower portion of a jacket of the injector and the support body.

22. The mounting device according to claim 20, wherein the tubular conductive element is comprised of a metal material having an external diameter substantially equivalent to an internal diameter of the support body.

23. The mounting device according to claim 20, wherein the tubular insulating element is comprised of a thermally insulating material and comprises a tubular central body having a smaller external diameter with respect to the internal diameter of the support body and an end flange at each opposing end of the central body, the end flanges being transversally arranged with respect to the central body and having an external diameter substantially equivalent to the internal diameter of the support body.

24. The mounting device according to claim 20, wherein the support body further includes a plurality of heat dissipation fins thereby increasing the thermal exchange surfaces.

25. The mounting device according to claim 24, wherein the heat dissipation fins are uniformly distributed both at the lower and upper portions of the support body.

26. The mounting device according to claim 24, wherein the heat dissipation fins extend to a jacket housing an electromagnet coil of the injector.

27. The mounting device according to claim 24, wherein each heat dissipation fin has a discoidal shape arranged perpendicularly to a longitudinal axis of the tubular support body.

28. The mounting device according to claim 24, further including a protective screen arranged at a lower end of the tubular body and having a larger external diameter than the external diameter of the heat dissipation fins to deflect of the heat transmission by radiation away from the heat dissipation fins.

* * * * *